US012641205B2

(12) United States Patent (10) Patent No.: US 12,641,205 B2
Ichieda et al. (45) Date of Patent: May 26, 2026

(54) CONTROL METHOD, NON-TRANSITORY COMPUTER-READABLE STORAGE MEDIUM STORING PROGRAM, AND PROJECTOR

(71) Applicant: SEIKO EPSON CORPORATION, Tokyo (JP)

(72) Inventors: Hiroyuki Ichieda, Matsumoto (JP); Takumi Oike, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 19/041,587

(22) Filed: Jan. 30, 2025

(65) Prior Publication Data

US 2025/0247510 A1 Jul. 31, 2025

(30) Foreign Application Priority Data

Jan. 31, 2024 (JP) ................................. 2024-013105

(51) Int. Cl.
H04N 9/31 (2006.01)

(52) U.S. Cl.
CPC ......... *H04N 9/3185* (2013.01); *H04N 9/3182* (2013.01); *H04N 9/3194* (2013.01)

(58) Field of Classification Search
CPC ...... H04N 9/31; H04N 9/3147; H04N 9/3179; H04N 9/3182; H04N 9/3185; H04N 9/3194
See application file for complete search history.

(56) References Cited

U.S. PATENT DOCUMENTS

| | | | | |
|---|---|---|---|---|
| 6,652,104 B2 * | 11/2003 | Nishida | ................ | H04N 9/3185 |
| | | | | 353/69 |
| 6,877,863 B2 * | 4/2005 | Wood | ................... | H04N 9/3185 |
| | | | | 353/42 |
| 7,070,283 B2 * | 7/2006 | Akutsu | .................... | H04N 5/74 |
| | | | | 353/30 |

(Continued)

FOREIGN PATENT DOCUMENTS

JP 2022-077773 A 5/2022

OTHER PUBLICATIONS

Epson. "Epson Projector Professional Tool Operation Guide." 2021.

*Primary Examiner* — Michael B. Pierorazio
(74) *Attorney, Agent, or Firm* — OLIFF PLC.

(57) ABSTRACT
A result of image pickup of first structured light projected in first projection range from one projector and a result of image pickup of second structured light projected in second projection range from another projector, second position in projection image projected from another projector corresponding to first position in projection image projected from one projector is specified. A geometric correction value of a composite image is specified, based on a result of image pickup of third structured light projected from one projector in a third projection range that is a range which is smaller than first projection range and wherein a part of a content is projected and a result of image pickup of a fourth structured light projected from the another projector in a fourth projection range that is a range which is smaller than the second projection range and wherein another part of the content is projected.

10 Claims, 5 Drawing Sheets

(56) References Cited

U.S. PATENT DOCUMENTS

| | | | | | |
|---|---|---|---|---|---|
| 7,182,466 | B2 * | 2/2007 | Sunaga | H04N 5/74 | 353/69 |
| 7,204,595 | B2 * | 4/2007 | Tamura | H04N 9/3194 | 353/69 |
| 7,270,421 | B2 * | 9/2007 | Shinozaki | G03B 21/142 | 353/121 |
| 7,359,575 | B2 * | 4/2008 | Bassi | G06T 3/18 | 345/427 |
| 7,441,906 | B1 * | 10/2008 | Wang | G03B 21/14 | 353/121 |
| 7,782,387 | B2 * | 8/2010 | Azuma | H04N 23/698 | 359/662 |
| 2002/0051095 | A1 * | 5/2002 | Su | H04N 9/3194 | 348/745 |
| 2002/0122161 | A1 * | 9/2002 | Nishida | H04N 9/3194 | 353/70 |
| 2003/0210381 | A1 * | 11/2003 | Itaki | H04N 5/74 | 353/70 |
| 2004/0156024 | A1 * | 8/2004 | Matsuda | H04N 9/3185 | 353/70 |
| 2005/0046803 | A1 * | 3/2005 | Akutsu | H04N 5/74 | 353/69 |
| 2005/0073661 | A1 * | 4/2005 | Tamura | H04N 9/3194 | 353/70 |
| 2005/0151934 | A1 * | 7/2005 | Akutsu | G03B 21/147 | 353/69 |
| 2005/0237492 | A1 * | 10/2005 | Shinozaki | H04N 9/3185 | 353/69 |
| 2006/0098167 | A1 * | 5/2006 | Sato | G03B 21/26 | 353/35 |
| 2006/0203207 | A1 * | 9/2006 | Ikeda | H04N 9/3185 | 353/70 |
| 2007/0008344 | A1 * | 1/2007 | Medina | G06T 15/10 | 345/647 |
| 2007/0257941 | A1 * | 11/2007 | Plut | G06F 9/451 | 345/660 |
| 2007/0285626 | A1 * | 12/2007 | Miyasaka | G03B 21/206 | 353/85 |
| 2009/0278999 | A1 * | 11/2009 | Ofune | H04N 21/47 | 348/E3.048 |
| 2010/0002123 | A1 * | 1/2010 | Nozaki | G03B 17/54 | 348/E5.022 |
| 2010/0045942 | A1 * | 2/2010 | Furui | H04N 9/3194 | 353/69 |
| 2011/0210979 | A1 * | 9/2011 | Furui | G03B 37/04 | 345/619 |
| 2011/0234994 | A1 * | 9/2011 | Uchiyama | H04N 9/3185 | 353/121 |
| 2011/0285971 | A1 * | 11/2011 | Oka | H04N 9/3185 | 353/70 |
| 2011/0292351 | A1 * | 12/2011 | Ishii | H04N 9/3185 | 353/69 |
| 2022/0303407 | A1 * | 9/2022 | Peng | G03B 21/142 | |
| 2023/0096353 | A1 * | 3/2023 | Li | H04N 9/3194 | 353/94 |
| 2024/0137476 | A1 * | 4/2024 | Horikawa | H04N 9/3182 | |

* cited by examiner

1

CONTROL METHOD, NON-TRANSITORY COMPUTER-READABLE STORAGE MEDIUM STORING PROGRAM, AND PROJECTOR

The present application is based on, and claims priority from JP Application Serial Number 2024-013105, filed Jan. 31, 2024, the disclosure of which is hereby incorporated by reference herein in its entirety.

BACKGROUND

1. Technical Field

The present disclosure relates to a control method, a non-transitory computer-readable storage medium storing a program, and a projector.

2. Related Art

As an example of a display device that displays an image, a projector including a projection unit that projects an image onto a projection target object such as a screen is employed. Depending on the relative positional relationship between the projector and the projection target object, a distortion such as a keystone distortion may occur in the image displayed on the projection target object. In order to avoid the occurrence of such a distortion, various corrections such as a geometric correction for adjusting the display mode may be performed on a projection target image in the projector. According to the related art, various techniques are proposed for accurately performing this type of correction, and an example of such techniques is the technique disclosed in JP-A-2022-77773. JP-A-2022-77773 discloses a projection control device that controls a projection unit projecting an image on a screen. The projection control device includes a specifier and a projection controller. The specifier specifies an image region. The image region is a region where image information projected by the projection unit is displayed on the screen. The projection controller causes an adjustment pattern to be projected in the image region specified by the specifier. The adjustment pattern is an adjustment pattern for obtaining an adjustment value used when adjusting the display mode of the image information, and is generated in such a way as to be projected in the image region.

JP-A-2022-77773 is an example of the related art.

Recently, a multi-projection system that arranges images projected by a plurality of projectors in a horizontal or vertical direction and combines these images into one large image is in increasingly widespread use. In the multi-projection system, in some cases, the correspondence relationship between a plurality of projection images cannot be found simply by projecting an adjustment pattern in a specified image region as in the technique disclosed in JP-A-2022-77773, and therefore there may be a problem in that a distortion cannot be accurately corrected, or the like.

SUMMARY

According to an aspect of the present disclosure, a control method for a multi-projection system is provided, the multi-projection system including a first projector that projects a first projection image in a first projection range, and a second projector that projects a second projection image forming a content by being combined with the first projection image, in a second projection range at least a part of which overlaps the first projection range, the control method including: projecting first structured light in the first projection range; picking up an image of the first structured light projected in the first projection range; projecting second structured light in the second projection range; picking up an image of the second structured light projected in the second projection range; specifying a second position in the second projection image corresponding to a first position in the first projection image, based on a result of image pickup of the first structured light and the second structured light; projecting third structured light in a third projection range that is a range which is smaller than the first projection range and in which a part of the content is projected; picking up an image of the third structured light projected in the third projection range; projecting fourth structured light in a fourth projection range that is a range which is smaller than the second projection range and in which another part of the content is projected; picking up an image of the fourth structured light projected in the fourth projection range; and specifying a geometric correction value of a composite image made up of the first projection image and the second projection image, based on a result of image pickup of the third structured light and the fourth structured light.

According to another aspect of the present disclosure, a non-transitory computer-readable storage medium storing a program is provided, the program causing a computer to execute: from a first projector that projects a first projection image in a first projection range, projecting first structured light in the first projection range; picking up an image of the first structured light projected in the first projection range; from a second projector that projects a second projection image forming a content by being combined with the first projection into a second projection range at least a part of which overlaps the first projection range, projecting second structured light in the second projection range; picking up an image of the second structured light projected in the second projection range; specifying a second position in the second projection image corresponding to a first position in the first projection image, based on a result of image pickup of the first structured light and the second structured light; projecting third structured light from the first projector in a third projection range that is a range which is smaller than the first projection range and in which a part of the content is projected; picking up an image of the third structured light projected in the third projection range; projecting fourth structured light from the second projector in a fourth projection range that is a range which is smaller than the second projection range and in which another part of the content is projected; picking up an image of the fourth structured light projected in the fourth projection range; and specifying a geometric correction value of a composite image made up of the first projection image and the second projection image, based on a result of image pickup of the third structured light and the fourth structured light. According to this aspect, a correction with high accuracy can be executed even when projection extending beyond the frame is performed.

According to still another aspect of the present disclosure, a projector includes: a projection device that projects a first projection image in a first projection range; a communication device that communicates with another projector that projects a second projection image forming a content by being combined with the first projection image, in a second projection range at least a part of which overlaps the first projection range; and a processing device, the processing device executing: projecting first structured light in the first projection range from the projection device; picking up an image of the first structured light projected in the first projection range; projecting second structured light in the second projection range from the another projector; picking up an image of the second structured light projected in the second projection range; specifying a second position in the second projection image corresponding to a first position in the first projection image, based on a result of image pickup of the first structured light and the second structured light; projecting third structured light from the projection device, in a third projection range that is a range which is smaller than the first projection range and in which a part of the content is projected; picking up an image of the third structured light projected in the third projection range; projecting fourth structured light from the another projector, in a fourth projection range that is a range which is smaller than the second projection range and in which another part of the content is projected; picking up an image of the fourth structured light projected in the fourth projection range; and specifying a geometric correction value of a composite image made up of the first projection image and the second projection image, based on a result of image pickup of the third structured light and the fourth structured light.

DESCRIPTION OF EMBODIMENTS

In the embodiment described below, various technically preferable limitations are given. However, embodiments of the present disclosure are not limited to the embodiment described below.

Embodiment

Figure 1:
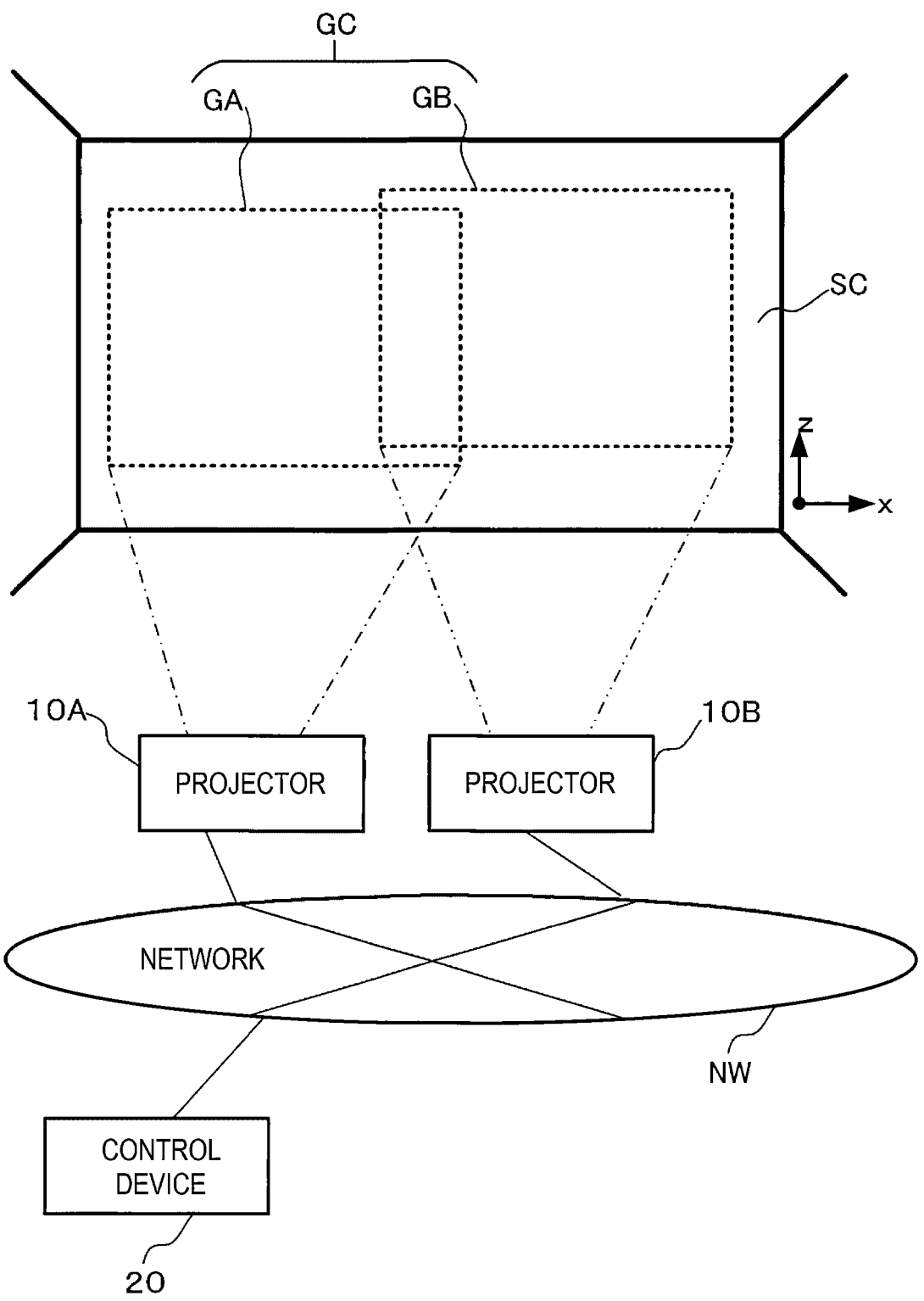
FIG. 1 shows an example of the configuration of a multi-projection system 1 according to an embodiment of the present disclosure.

FIG. 1 shows an example of the configuration of a multi-projection system 1 according to an embodiment of the present disclosure. As illustrated in FIG. 1, the multi-projection system 1 includes a projector 10A and a projector 10B that respectively project images onto a projection target object SC, and a control device 20 that communicates with the projector 10A and the projector 10B via a network NW. As a specific example of the network NW, a wired or wireless local area network (LAN), a wired or wireless USB, or Bluetooth (registered trademark) may be employed.

The projection target object SC in the present embodiment is, for example, an inner wall of a room of the user of the multi-projection system 1. An image GC displayed on the projection target object SC by the multi-projection system 1 is formed by combining an image GA projected on the projection target object SC by the projector 10A and an image GB projected on the projection target object SC by the projector 10B. An arrow z in FIG. 1 indicates the vertical direction, and an arrow x indicates one of two directions orthogonal to the vertical direction (hereinafter referred the horizontal direction). Each of the projector 10A and the projector 10B includes a generator (described later) such as a liquid crystal panel.

As shown in FIG. 1, in the present embodiment, the projector 10A is made to project an image representing a part of a content and the projector 10B is made to project an image representing another part of the content in such a way that the projection range of the image by the projector 10A and the projection range of the image by the projector 10B partly overlap each other in the horizontal direction, and the image GC corresponding to the entire content is thus formed. That is, a part of the projection range of the image by the projector 10A overlaps a part of the projection range of the image by the projector 10B in the horizontal direction. In the present embodiment, the image GC is a so-called tiled image. The image GC may be a stacked image in which the entire projection range of the image by the projector 10A overlaps the entire projection range of the image by the projector 10B. The projector 10A is an example of the first projector according to the present disclosure. The projector 10B is an example of the second projector according to the present disclosure.

In the present embodiment, the configuration of the projector 10A and the configuration of the projector 10B are the same. Hereinafter, when there is no need to distinguish the projector 10A and the projector 10B, the projector 10A and the projector 10B are referred to as the "projector 10".

The wall surface of the room is not flat like a screen and therefore the image displayed on the wall surface by the projector 10 may be distorted according to a dent or a bulge on the wall surface. Also, when the projection lens of the projector 10 does not face the wall surface straight, the image displayed on the wall surface by the projector 10 is distorted. In the present embodiment, a correction value for correcting the distortion of the image is calculated, using a measurement pattern such as a Gaussian dot pattern or a phase shift pattern as in the related art.

Figure 2:
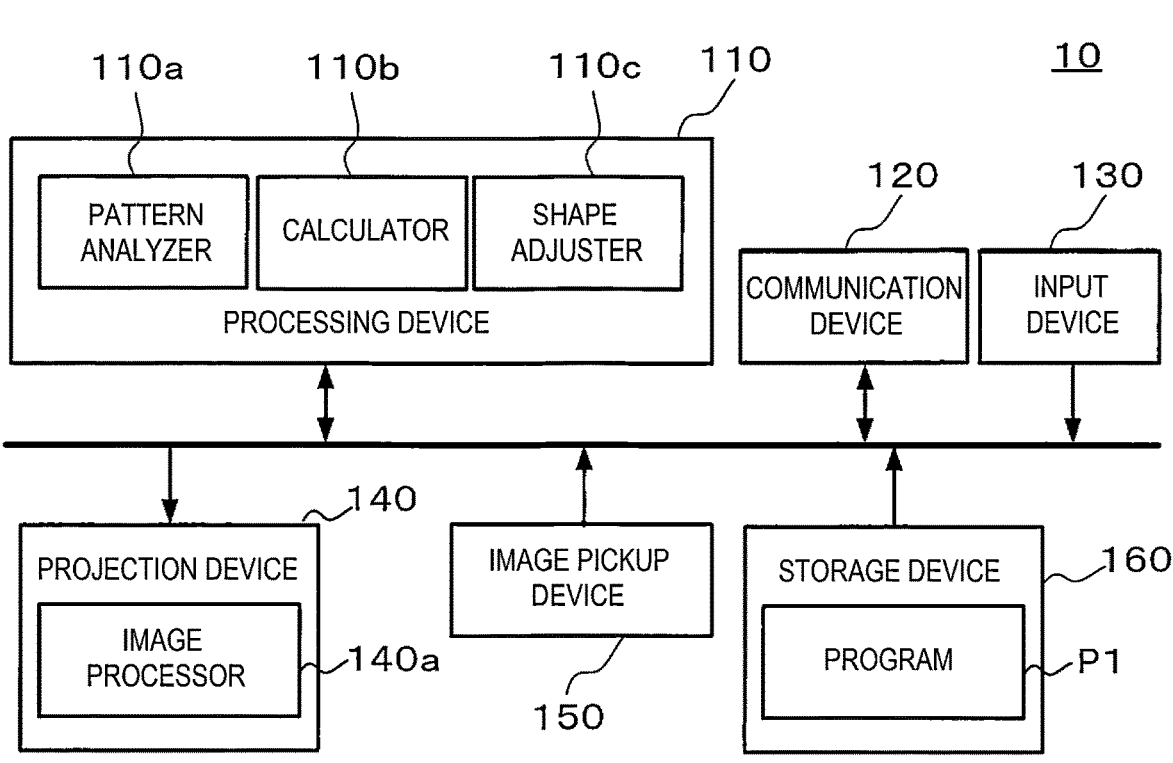
FIG. 2 shows an example of the configuration of a projector 10.

FIG. 2 is a diagram showing an example of the configuration of the projector 10. As illustrated in FIG. 2, the projector 10 includes a processing device 110, a communication device 120, an input device 130, a projection device 140, an image pickup device 150, and a storage device 160. Each of the communication device 120, the input device 130, the projection device 140, the image pickup device 150, and the storage device 160 is coupled to the processing device 110 via a bus (not illustrated in FIG. 2).

The processing device 110 is, for example, a computer such as a central processing unit (CPU). As will be described in detail later, the processing device 110 operates in accordance with a program P1 stored in advance in the storage device 160 and thus functions as a control center of the projector 10.

The communication device 120 is a device that communicates with another device via the network NW, and includes, for example, an interface circuit. A specific example of the another device that communicates with the communication device 120 is the control device 20. The communication device 120 provides data received from the network NW to the processing device 110.

To the input device 130, image data representing an image to be projected onto the projection target object SC by the projector 10 is input from outside. The input device 130 in this embodiment is an HDMI interface, but may be a VGA interface. The image data may be input to the projector 10 via the network NW, and in this case, the communication device 120 may also serve as the input device 130. HDMI is a registered trademark.

The projection device 140 includes a generator that generates image light corresponding to image data, and an optical system that guides the image light generated by the generator to the projection target object SC and implements optical zoom and lens shift. In FIG. 1, the generator and the optical system are not shown. As a specific example of the generator, a light modulation element such as a liquid crystal display (LCD), a liquid crystal on silicon (LCOS), or a digital micromirror device (DMD). The projection device 140 includes an image processor 140a such as an image processing circuit that adjusts the shape of the image represented by the image data, based on a correction value calculated by a calculator 110b described later.

The image pickup device 150 includes a CMOS or a CCD image sensor. In the present embodiment, the image pickup region of the image pickup device 150 is set in advance in such a way as to cover the entire projection region where an image is projected by the projection device 140, but the image pickup region may be set in such a way that an image of at least a part of the projection region can be picked up. As will be described in detail later, in the present embodiment, structured light of a Gaussian dot pattern or a phase shift pattern is projected from the projector 10 onto the projection target object SC in order to calculate a correction value for distortion correction, and the image pickup device 150 is used for the image pickup of the projection target object SC on which the structured light is projected. The type of structured light is not particularly limited, provided that at least the purpose of calculating the correction value for distortion correction can be achieved.

The storage device 160 includes a nonvolatile memory such as a flash read-only memory (ROM), and a volatile memory such as a random-access memory (RAM). The nonvolatile memory of the storage device 160 stores the program P1 for causing the processing device 110 to function as the control center of the projector 10. The nonvolatile memory of the storage device 160 is used by the processing device 110 as a work area when executing the program P1. When the power (not shown in FIG. 2) of the projector 10 is turned on, the processing device 110 reads out the program P1 from the nonvolatile memory into the volatile memory and starts executing the program P1 read out into the volatile memory.

The processing device 110 operating according to the program P1 functions as a pattern analyzer 110a, the calculator 110b, and a shape adjuster 110c. The pattern analyzer 110a analyzes the result of image pickup by the image pickup device 150 and thus establishes a correspondence between a position in a camera coordinate system that prescribes a position on a picked-up image and a position in a panel coordinate system that prescribes a position on an image drawn by the generator. For this correspondence, a known technique may be employed as appropriate. The calculator 110b calculates a correction value for distortion correction, based on the result of analysis by the pattern analyzer 110a. The shape adjuster 110c causes the projection device 140 to project a UI image for adjusting the shape of the projection image. The UI image will be described later.

Figure 3:
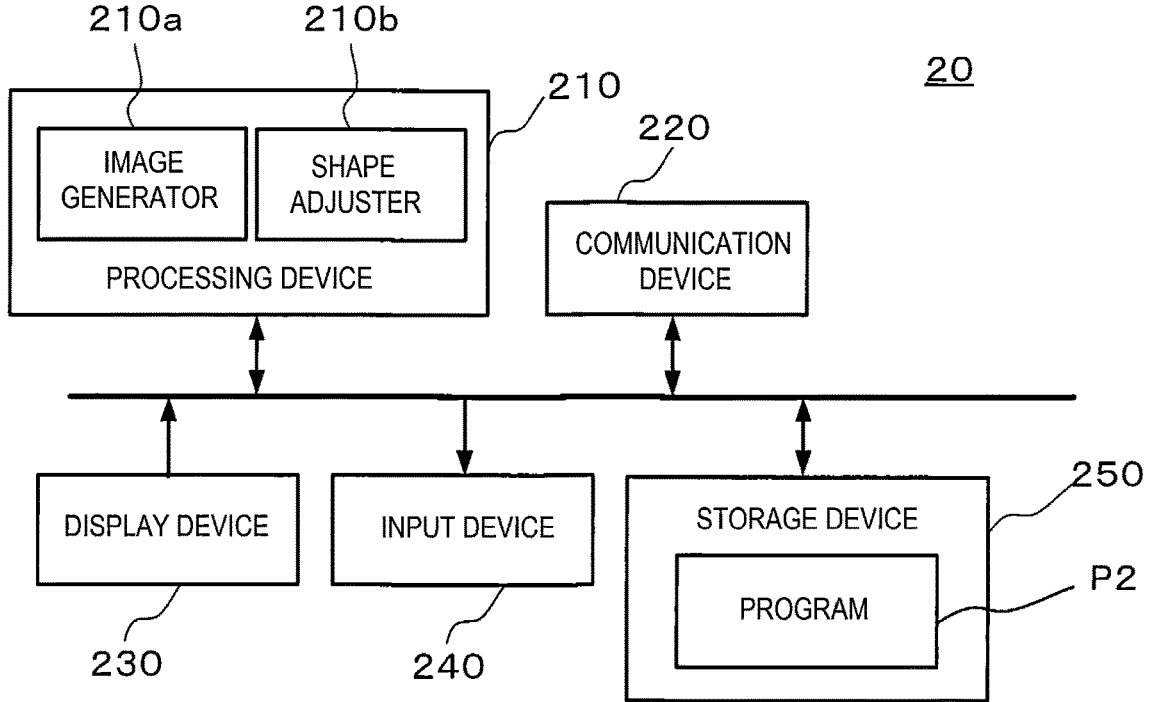
FIG. 3 shows an example of the configuration of a control device 20.

FIG. 3 shows an example of the configuration of the control device 20. The control device 20 is, for example, a personal computer. As illustrated in FIG. 3, the control device 20 includes a processing device 210, a communication device 220, a display device 230, an input device 240, and a storage device 250. Each of the communication device 220, the display device 230, the input device 240, and the storage device 250 is coupled to the processing device 210 via a bus (not illustrated in FIG. 3).

The processing device 210 is a computer such as a CPU, similarly to the processing device 110. The processing device 210 executes various programs stored in the storage device 250.

The communication device 220 includes an interface circuit, similarly to the communication device 120. A specific example of the another device that communicates with the communication device 220 is the projector 10. The communication device 220 provides data received from the network NW to the processing device 210.

The display device 230 includes, for example, a liquid crystal display and a drive circuit thereof (neither of which is shown in FIG. 3). The drive circuit includes a video memory where an image to be displayed on the liquid crystal display is drawn by the processing device 210.

The input device 240 includes a keyboard having a plurality of operating elements, and a pointing device such as a mouse. The input device 240 accepts a user's operation such as a press on an operating element, and provides operation content data representing the accepted operation to the processing device 210. Thus, the operation content of the user is transmitted to the processing device 210.

The storage device 250 includes a nonvolatile memory such as a hard disk, and a volatile memory such as a RAM. The nonvolatile memory of the storage device 250 stores various programs. Examples of the program stored in the nonvolatile memory of the storage device 250 include a kernel program (not shown in FIG. 3) for implementing an operating system (OS), and a program P2 for implementing a control method that clearly represents features of the present disclosure. The volatile memory of the storage device 250 is used as a work area when executing these programs.

The processing device 210 reads out the kernel program from the nonvolatile memory into the volatile memory in response to the power (not shown in FIG. 3) of the control device 20 being turned on, and starts executing the kernel program read out into the volatile memory. The processing device 210 operating in accordance with the kernel program can read out a program which the processing device 210 is instructed to execute by an operation to the input device 240, from the nonvolatile memory into the volatile memory, and can execute the program. For example, when being instructed to execute the program P2 by the operation to the input device 240, the processing device 210 reads out the program P2 from the nonvolatile memory to the volatile memory and starts executing the program P2 read out into the volatile memory.

Figure 4:
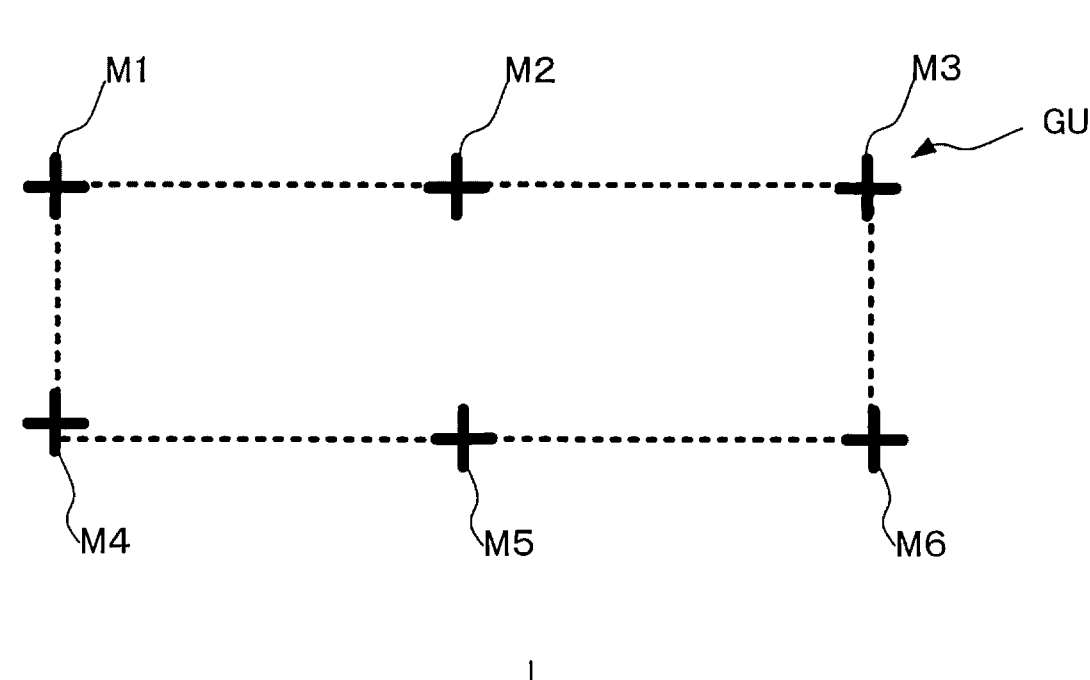
FIG. 4 illustrates a UI screen for adjusting the shape of a projection image.
Figure 4:
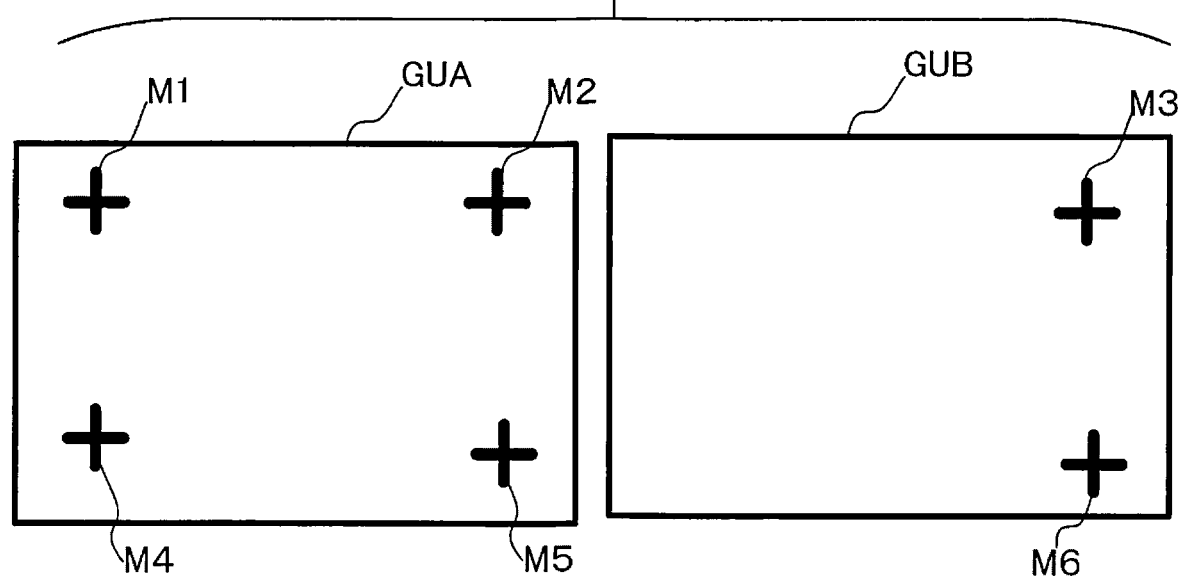

The processing device 210 operating according to the program P2 functions as an image generator 210a and a shape adjuster 210b. The image generator 210a generates an image of a UI screen (hereinafter referred to as a UI image) for prompting an operation for executing the control method of the present disclosure, and causes the display device 230 to display the UI image. As an example of the UI image, an image GU in which cross-shaped anchors M1 to M6 are evenly arranged along the outer perimeter of the image of the content, as shown in FIG. 4, is employed. The user can perform an operation of changing the position of each of the cross-shaped anchors M1 to M6 in an image GUA displayed on the display device 230 and thus can instruct the control device 20 to adjust the shape of the image of the content displayed on the projection target object SC. The image GUA is an example of the first adjustment image for adjusting the first projection image according to the present disclosure. The cross-shaped anchors M1 to M6 are an example of a plurality of adjustment points according to the present disclosure. The cross-shaped anchors M1, M2, M4, and M5 provided in the image GUA are an example of a plurality of first adjustment points according to the present disclosure. The cross-shaped anchors M3 and M6 provided in an image GUB are an example of a plurality of second adjustment points according to the present disclosure. The shape of each of the cross-shaped anchors M1 to M6 is not limited to a cross and may be a circle, a dot, or a polygon including a quadrilateral.

The shape adjuster 210b adjusts the shape of the image of the content displayed on the projection target object Sc in response to an instruction from the user. More specifically, the shape adjuster 210b transmits position information indicating the positions of the cross-shaped anchors M1 to M6 indicated by the operation on the image GU to the projector 10, using the communication device 220. The projector 10 displays the cross-shaped anchors M1 to M6 on the projection target object SC according to the position information. The projector 10A displays the UI image GUA in which the cross-shaped anchors M1, M2, M4, and M5 are arranged according to the position information, as shown in FIG. 4. Meanwhile, the projector 10B displays the UI image GUB in which the cross-shaped anchors M3 and M6 are arranged according to the position information, as shown in FIG. 4. Therefore, in an overlap region where the projection range by the projector 10A and the projection range by the projector 10B overlap each other, the cross-shaped anchors M2 and M5 are displayed only by the projector 10A. This is to eliminate a redundant adjustment by the user. The user adjusts the positions of the cross-shaped anchors M3 and M6 in the UI image GUB with reference to the UI image GUA and thus roughly adjusts the overall shape of the image GU. The image GUB is an example of the second adjustment image for adjusting the second projection image according to the present disclosure.

Figure 5:
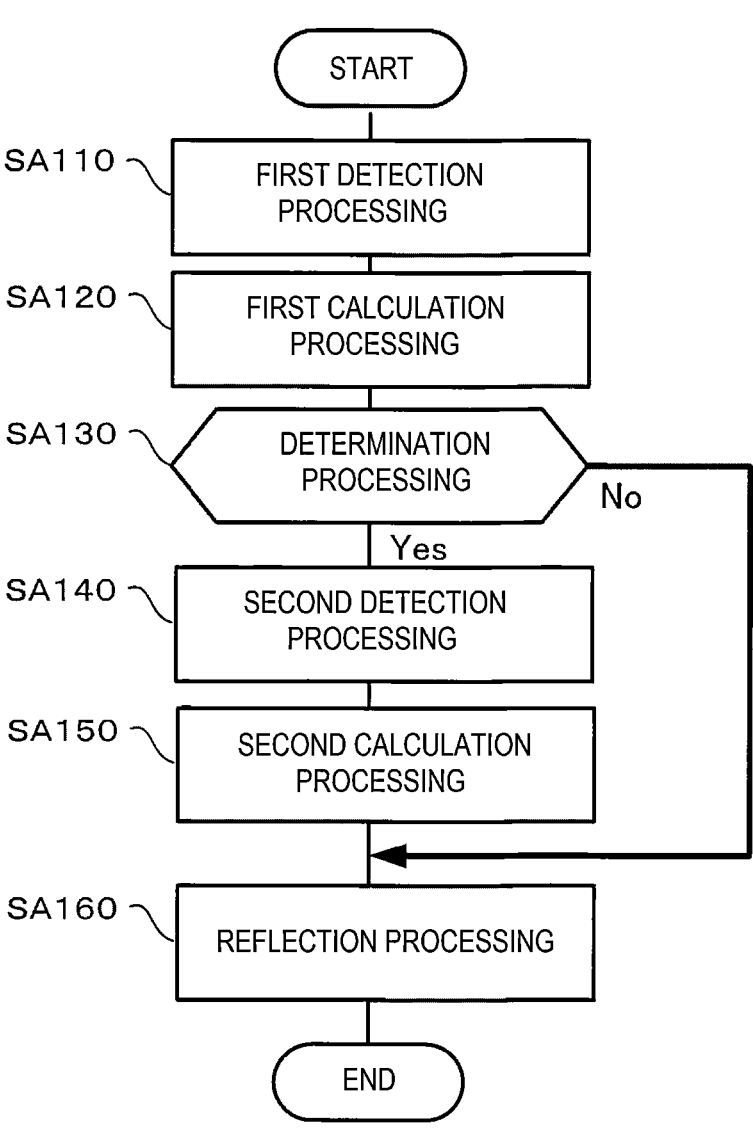
FIG. 5 is a flowchart showing a flow of processing in a control method executed by a processing device 210 of the control device 20 according to a program P2.

Also, the shape adjuster 210b executes a control method that clearly represents the features of the present disclosure. FIG. 5 is a flowchart illustrating a flow of processing in this control method. As shown in FIG. 5, the control method includes first detection processing SA110, first calculation processing SA120, determination processing SA130, second detection processing SA140, second calculation processing SA150, and reflection processing SA160.

In the first detection processing SA110, the shape adjuster 210b causes each of the projector 10A and the projector 10B to project the foregoing structured light and causes the image pickup device 150 to pick up an image of the structured light, and thus executes the establishment of the correspondence between the camera coordinate system of the image pickup device and the panel coordinate system of the projector. For example, in the first detection processing SA110, the shape adjuster 210b executes the establishment of the correspondence between the camera coordinate system and the panel coordinate system with the following procedure. First, only the projector 10A projects structured light. Next, the image pickup device 150 picks up an image of the structured light projected only from the projector 10A. At this timing, a correspondence relationship (first correspondence relationship) between the panel coordinate system of the projector 10A and the camera coordinate system of the image pickup device 150 may be generated. Next, only the projector 10B projects structured light. Next, the image pickup device 150 picks up an image of at least a part overlapping the image GA, of the structured light projected only from the projector 10B. At this timing, a correspondence relationship (second correspondence relationship) between the panel coordinate system of the projector 10B and the camera coordinate system of the image pickup device 150 may be generated. The projection range where the projector 10A projects the structured light in the first detection processing SA110 is an example of the first projection range according to the present disclosure, and the structured light is an example of the first structured light. The projection range where the projector 10B projects the structured light in the first detection processing SA110 is an example of the second projection range according to the present disclosure, and the structured light is an example of the second structured light.

In the first calculation processing SA120, the shape adjuster 210b connects the cross-shaped anchors M1 to M6 together, based on the correspondence relationship between the camera coordinate system and the panel coordinate system of each of the projector 10A and the projector 10B and the positions of the cross-shaped anchors M1 to M6. At this timing, one of the projector 10A and the projector 10B can grasp the positions of the cross-shaped anchors displayed by the other of the projector 10A and the projector 10B. That is, the projector 10B can specify the position of each of the cross-shaped anchors M2 and M5, that is, the cross-shaped anchor located at the right end in the image projected by the projector 10A, in the panel coordinate system of the projector 10B. The position of each of the cross-shaped anchors M2 and M5 in the image projected by the projector 10A is an example of the first position according to the present disclosure, and the position of each of the cross-shaped anchors M2 and M5 in the panel coordinate system of the projector 10B is an example of the second position according to the present disclosure.

That is, in the first calculation processing SA120, for example, the correspondence relationship (panel correspondence relationship) between the panel coordinate system of the projector 10A and the panel coordinate system of the projector 10B is calculated, based on the first correspondence relationship and the second correspondence relationship calculated in the first detection processing SA110. Then, based on this correspondence relationship, the shape adjuster 210b specifies which positions in the image (second adjustment image) projected by the projector 10B the positions of the cross-shaped anchors M2 and M5 in the image (first adjustment image) projected by the projector 10A correspond to. When the image GC is a stacked image, the entirety of the image GB is manually adjusted by the user with reference to the entirety of the image GA, and therefore the panel correspondence relationship may not be necessarily generated.

In the first calculation processing SA120, the shape adjuster 210b may also calculate a correction value for ensuring the linearity inside the composite image. The timing at which the correction value is calculated is not particularly limited, provided that the timing is the first calculation processing SA120 or a step after the first calculation processing SA120.

Figure 6:
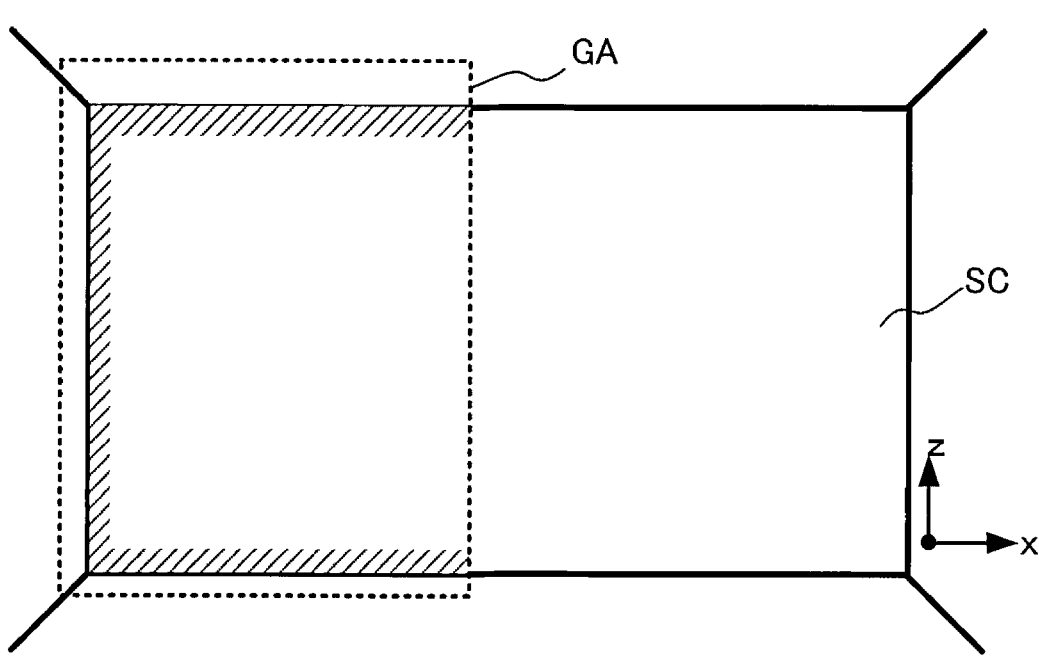
FIG. 6 illustrates extension beyond the frame.

In the determination processing SA130, the shape adjuster 210b determines whether projection extending beyond the frame is performed. The projection extending beyond the frame refers to projecting an image extending beyond the projection target object SC to a ceiling or a side surface or the like. In a use situation where a composite image is displayed on the entire projection target object SC, it may be necessary to project an image extending to the ceiling or the side surface, depending on the installation condition of the projector 10 in relation to the projection target object SC. FIG. 6 shows an example in which the image GA is projected, extending to the ceiling and the side surface. When the image is projected, extending to the ceiling or the side surface, secondary reflected light, which is reflected light of the image light from the ceiling or the side surface, is added to the structured light as a noise, and an error may occur in specifying the correspondence relationship and thus may cause a reduction in the superimposition accuracy of the projection image. The oblique hatching in FIG. 6 represents the noise caused by the secondary reflected light. In the present embodiment, the shape adjuster 210*b* causes the display device 230 to display a message for inquiring of the user about whether the projection extending beyond the frame is performed, and determines whether the projection extending beyond the frame is performed, based on the response of the user to the message. The shape adjuster 210*b* causes the display device 230 to display a message inquiring about whether the projection extending beyond the frame is performed, for example, before the first detection processing SA110, and accepts the response from the user. The shape adjuster 210*b* causes the storage device 250 to store the content of the response accepted before the first detection processing SA110. In the determination processing SA130, the shape adjuster 210*b* calls the content of the response stored in the storage device 250 and determines whether the projection extending beyond the frame is performed. At least one of the timing at which the message is displayed and the timing at which the response of the user is accepted is not particularly limited, provided that it is a step before the determination processing SA130. That is, before the determination processing SA130, the timing at which the response of the user is accepted may be different from or the same as the timing at which the message is displayed.

When the determination result in the determination processing SA130 is "Yes", that is, when the projection extending beyond the frame is performed, the shape adjuster 210*b* executed the second detection processing SA140 and the second calculation processing SA150 and subsequently executes the reflection processing SA160. When the determination result in the determination processing SA130 is "No", that is, when the projection extending beyond the frame is not performed, the shape adjuster 210*b* executes the reflection processing SA160 without executing the second detection processing SA140 and the second calculation processing SA150.

In the second detection processing SA140, the shape adjuster 210*b* causes each of the projector 10A and the projector 10B to project the structured light in a projection range narrower than the projection range of the structured light in the first detection processing SA110 and pick up an image of the structured light, and thus re-executes the establishment of the correspondence between the camera coordinate system and the panel coordinate system of each projector. In the embodiment, the projector 10A projects the structured light that is masked so that the cross-shaped anchors M1, M2, M4, and M5 prescribes the four corners, based on the correction value calculated in the first calculation processing SA120. The projector 10B projects the structured light that is masked so that the cross-shaped anchors M2, M3, M5, and M6 prescribe the four corners, based on the correction value calculated in the first calculation processing SA120. That is, in the present embodiment, the mask is set, based on the positions of the plurality of adjustment points, with respect to the image GUA projected from the projector 10A and the image GUB projected from the projector 10B.

Figure 7:
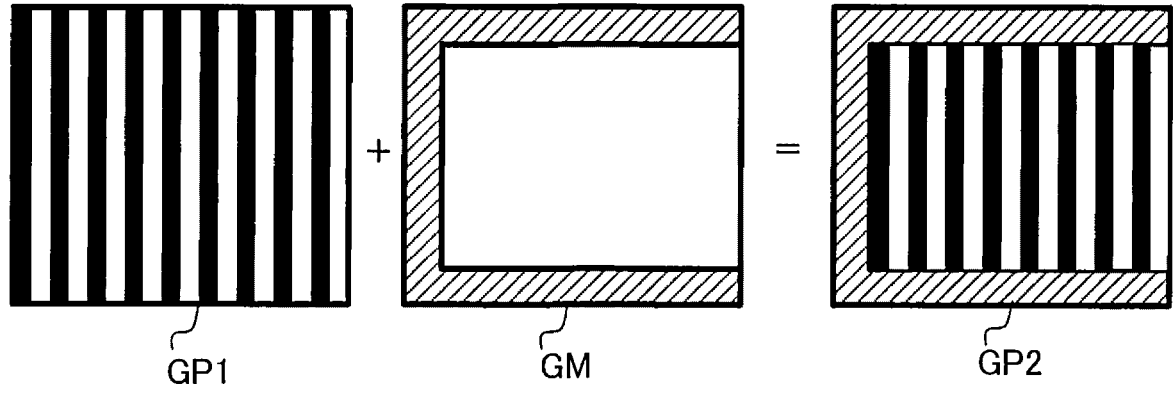
FIG. 7 illustrates structured light projected by the projector 10 when extension beyond the frame occurs.

In the embodiment, as shown in FIG. 7, the projector 10 draws an image GP1 representing the structured light on a first layer in the video memory and draws a mask GM prescribed by the cross-shaped anchors on a second layer superimposed on the first layer, and thus generates an image GP2 of the masked structured light, but the projector 10 may draw the image GP1 and the mask GM on the same layer to generate the image GP2. The four corners of the white part of the mask GM correspond to the positions of the cross-shaped anchors, and the transmittance of the white part is 100%. Also, when the composite image is a tiled image, a region from the cross-shaped anchor M2 to M5 (that is, a region where the image projected from the projector 10A and the image projected from the projector 10B overlap each other) in the image GP1 (image GUA) projected from the projector 10A is not masked, as shown in FIG. 7. Similarly, though not illustrated, a region from the cross-shaped anchor M2 to M5 (that is, a region where the image projected from the projector 10A and the image projected from the projector 10B overlap each other) in the image GP1 (image GUB) projected from the projector 10B is not masked. Thus, in the region where the image projected from the projector 10A and the image projected from the projector 10B overlap each other, a situation where a part of the composite image is hidden by the mask is prevented. In the mask GM, the light transmittance of a part around the white part (the part with oblique hatching) is 0%. That is, in the present embodiment, the part around the white part in the mask GM is a black image. In the mask GM, the part around the white part may be an image formed in a single color such as red, blue, or green. As the structured light masked by the mask GM is projected, the influence of the reflected light of the light extending to the ceiling or the side surface can be reduced, and the correspondence relationship between the camera coordinate system and the panel coordinate system can be accurately specified. The projection range in which the projector 10A projects the structured light in the second detection processing SA140 is an example of the third projection range according to the present disclosure, and this structured light is an example of the third structured light. The projection range in which the projector 10B projects the structured light in the second detection processing SA140 is an example of the fourth projection range according to the present disclosure, and this structured light is an example of the fourth structured light. The mask GM shown in FIG. 7 is for the case where the composite image is a tiled image, but when the composite image is a stacked image, the region from the cross-shaped anchor M2 to M5 may be masked as well.

In the second calculation processing SA150, the shape adjuster 210*b* connects the cross-shaped anchors together, based on the correspondence relationship between the panel coordinate system of the projector 10A and the panel coordinate system of the projector 10B specified in the second detection processing SA140 and the positions of the cross-shaped anchors M1 to M6.

When the determination result in the determination processing SA130 is "Yes", in the reflection processing SA160, the correction value calculated in the second calculation processing SA150 is set in the image processor 140*a*. When the determination result in the determination processing SA130 is "No", in the reflection processing SA160, the correction value calculated in the first calculation processing SA120 is set in the image processor 140*a*.

The present embodiment is summarized below.

In the first detection processing SA110, each of the projector 10A and the projector 10B projects the structured light that is not masked. Next, in the first calculation processing SA120, the processing device 210 specifies the positions of the cross-shaped anchors M2 and M5 in the second adjustment image projected from the projector 10B, based on the correspondence relationship between the panel coordinate system of the projector 10A and the panel coordinate system of the projector 10B. When the processing device 210 determines in the determination processing SA130 that the projection extending beyond the frame is performed, the processing device 210 causes each of the projector 10A and the projector 10B to project the masked structured light in the second detection processing SA140. The mask is based on the positions of the cross-shaped anchors M1 to M6 including the positions of the cross-shaped anchors M2 and M5 in the second adjustment image calculated in the first calculation processing SA120. In the second calculation processing SA150, the processing device 210 connects the cross-shaped anchors together, based on the correspondence relationship between the panel coordinate system of the projector 10A and the panel coordinate system of the projector 10B specified in the second detection processing SA140 and the positions of the cross-shaped anchors M1 to M6.

That is, in the present embodiment, the structured light is projected twice from each of the projector 10A and the projector 10B. In the first round (the first detection processing SA110), the structured light that is not masked is projected, and in the second round (the second detection processing SA140), the masked structured light is projected. When the projection extending beyond the frame is performed, the accuracy of the correspondence relationship between the panel coordinate system of the projector 10A and the panel coordinate system of the projector 10B specified in the second detection processing SA140 is improved by the structured light projected in the second round, which is masked based on the structured light projected in the first round. The panel correspondence relationship specified in the first detection processing SA110 may be affected by the secondary reflected light, but the objective of approximately specifying the positions of the cross-shaped anchors M1 to M6 (particularly the positions of M2 and M5) for prescribing the mask can be achieved. Subsequently, the panel correspondence relationship is generated again, based on the structured light that is masked in accordance with the position of each of the cross-shaped anchors M1 to M6 specified in the second detection processing SA140, and therefore the influence of the secondary reflected light is reduced and the accuracy of the geometric correction is improved, compared with when the panel correspondence relationship generated in the first detection processing SA110 is used for the geometric correction.

Also, the structured light projected in the first detection processing SA110 is not masked and therefore includes not only the positions of the cross-shaped anchors M1 to M6 but also the positions of pixels around these cross-shaped anchors. Thus, though the panel correspondence relationship specified in the first detection processing SA110 may be affected by the secondary reflected light, a reduction in the accuracy of approximately specifying the positions of the cross-shaped anchors M1 to M6 (particularly the positions of M2 and M5) due to a lack of information about the surrounding pixels can be suppressed.

Also, since the structured light projected in the first detection processing SA110 is not masked, the user can easily determine how much the structured light is affected by the secondary reflected light particularly when the composite image is a stacked image. That is, the present embodiment can improve the convenience for the user even in the case of a stacked image, with which the panel correspondence relationship need not necessarily be calculated.

As described above, according to the present embodiment, that is, when the projection extending beyond the frame is performed, the influence of the reflected light of the light extending to the ceiling or the side surface can be reduced and the geometric correction of the composite image can be accurately performed.

2-1. Modification Example 1

In the foregoing embodiment, images are projected horizontally next to each other from the two projectors 10 onto the projection target object SC, thus forming a composite image, but the projection images from the projectors may be arranged vertically next to each other, and three or more projectors may be used. Also, instead of arranging projection images from a plurality of projectors next to each other to form a composite image, that is, instead of constructing a tiled image, projection images may be superimposed on each other to form a composite image, that is, a stacked image may be constructed. The display surface for the image on the projection target object SC is not limited to a flat surface and may be a curved surface. When the display surface for the composite image is a curved surface, the number of the cross-shaped anchors may be increased to, for example, 5 horizontally by 3 vertically, or the like, in order to ensure the linearity inside the composite image. The composite image may also be an image in which a tiled image and a stacked image are combined together.

2-2. Modification Example 2

The control device 20 may be provided in one of the projector 10A and the projector 10B. For example, when the control device 20 is provided in the projector 10A, the projector 10A is a main projector that controls the projector 10B. When the control device 20 is provided in the projector 10A, the user may be instructed to adjust the shape of the composite image, using an OSD menu or the like of the projector 10A.

2-3. Modification Example 3

In the determination processing SA130 in the foregoing embodiment, whether the projection extending beyond the frame is performed is determined, based on an instruction from the user, but whether the projection extending beyond the frame is performed may be determined, based on whether the picked-up image picked up by the image pickup device 150 includes a component of secondary reflected light from the ceiling or the like. In this aspect, when it is determined that the projection extending beyond the frame is performed, a notification may be given to the user, such as displaying a message notifying that the projection extending beyond the frame is performed. In a configuration where whether the projection extending beyond the frame is performed is determined, based on whether the picked-up image picked up by the image pickup device 150 includes a component of secondary reflected light from the ceiling or the like, a third projection range and a fourth projection range may be automatically set, based on the picked-up image picked up by the image pickup device 150, so as not to include the secondary reflected light. In this case, the difference between the automatically set third projection range and the first projection range and the difference between the automatically set fourth projection range and the second projection range may be colored in red or the like to notify the user of the differences, and this notification may be executed before the second calculation processing SA150 is executed, that is, before the correction value is specified.

2-4. Modification Example 4

Figure 8:
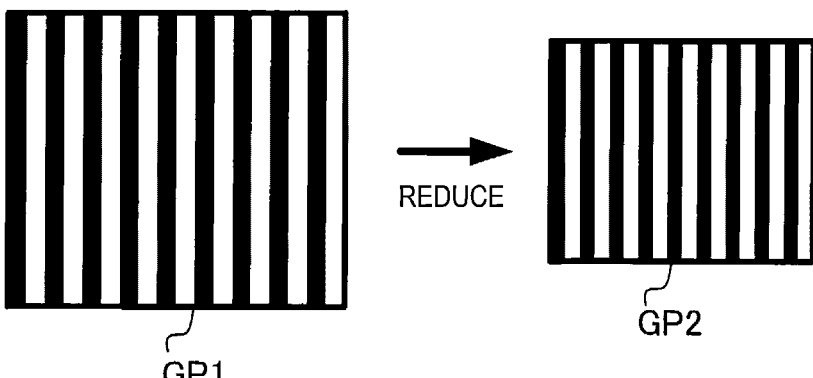
FIG. 8 illustrates Modification Example 4.

The image GP2 may be generated by reducing the image GP1 as shown in FIG. 8. That is, the image GP2 may not be an image generated by masking the image GP1. Also, when the image GP2 is generated by reduction, a notification corresponding to the reduction ratio of the image GP2 in relation to the image GP1 may be given to the user. In this modification example, a predetermined reduction ratio may be applied to the image GP1 in at least one of the horizontal direction and the vertical direction, or pixels may be thinned out. The predetermined reduction ratio may be a fixed value or a variable that can be set by the user.

2-5. Modification Example 5

In the foregoing embodiment, the control device 20 executes all of the first detection processing SA110, the first calculation processing SA120, the determination processing SA130, the second detection processing SA140, the second calculation processing SA150, and the reflection processing SA160, but this is not limiting. For example, the processing device 110 of the projector 10A may execute the first detection processing SA110, the first calculation processing SA120, and the determination processing SA130, and the control device 20 may execute the second detection processing SA140, the second calculation processing SA150, and the reflection processing SA160. For example, the processing device 110 of the projector 10A may execute the first detection processing SA110, the first calculation processing SA120, and the determination processing SA130, and the processing device 110 of the projector 10B may execute the second detection processing SA140, the second calculation processing SA150, and the reflection processing SA160. That is, each operation (step) executed based on the program P2 may be appropriately allocated to the control device 20, the projector 10A, and the projector 10B. In this case, the program P2 may be stored in the storage device 160 of the projector 10A or the storage device 160 of the projector 10B.

2-6. Modification Example 6

In the foregoing embodiment, the projector 10A may execute at least the first detection processing SA110 and the second detection processing SA140 while communicating with the projector 10B. For example, after only the projector 10A projects the structured light, the projector 10A may transmit, to the projector 10B, a command signal for projecting the structured light only from the projector 10B, or may receive at least a part of information necessary for the projector 10A to generate the panel correspondence relationship from the projector 10B. At least a part of the information necessary for generating the panel correspondence relationship is, for example, data representing the number of pixels or the coordinates of the pixels in the generator of the projector 10B.

3. Summary of Present Disclosure

The present disclosure is not limited to the foregoing embodiment and modification examples and can be implemented according to various aspects without departing from the spirit and scope of the present disclosure. For example, the present disclosure can also be implemented according to the following aspects. Technical features in the above embodiment corresponding to technical features in the aspects described below can be replaced or combined as appropriate, in order to solve a part or all of the problems of the present disclosure or in order to achieve a part or all of the effects of the present disclosure. Also, the technical features can be deleted as appropriate, unless described as essential in the present specification.

The present disclosure will be summarized below as appendices.

Appendix 1

According to an aspect of the present disclosure, a control method for a multi-projection system is provided, the multi-projection system including a first projector that projects a first projection image in a first projection range, and a second projector that projects a second projection image forming a content by being combined with the first projection image, in a second projection range at least a part of which overlaps the first projection range, the control method including: projecting first structured light in the first projection range; picking up an image of the first structured light projected in the first projection range; projecting second structured light in the second projection range; picking up an image of the second structured light projected in the second projection range; specifying a second position in the second projection image corresponding to a first position in the first projection image, based on a result of image pickup of the first structured light and the second structured light; projecting third structured light in a third projection range that is a range which is smaller than the first projection range and in which a part of the content is projected; picking up an image of the third structured light projected in the third projection range; projecting fourth structured light in a fourth projection range that is a range which is smaller than the second projection range and in which another part of the content is projected; picking up an image of the fourth structured light projected in the fourth projection range; and specifying a geometric correction value of a composite image made up of the first projection image and the second projection image, based on a result of image pickup of the third structured light and the fourth structured light. According to this aspect, a correction with high accuracy can be executed even when projection extending beyond the frame is performed.

Appendix 2

According to another aspect, the control method according to Appendix 1 may include accepting an operation of designating the third projection range by a user, and accepting an operation of designating the fourth projection range by the user. According to this aspect, the user can designate the third projection range and the fourth projection range.

Appendix 3

According to another aspect, the control method according to Appendix 1 may further include setting the third projection range and the fourth projection range, based on a result of image pickup of the first structured light projected in the first projection range and the second structured light projected in the second projection range. According to this aspect, it is automatically detected that the projection extending beyond the frame is performed, and the third projection range and the fourth projection range are automatically set.

Appendix 4

According to another aspect, the control method according to Appendix 3 may further include notifying a user of a difference between the first projection range and the third projection range and a difference between the second projection range and the fourth projection range before specifying the geometric correction value. According to this aspect, the user can grasp the difference between the automatically set third projection range and the first projection range and the difference between the automatically set fourth projection range and the second projection range.

Appendix 5

According to another aspect, in the control method according to one of Appendices 1 to 4, the composite image may be a tiled image in which a part of the first projection range overlaps a part of the second projection range, the first position may be a position in a part of the first projection range, and the second position may be a position in a part of the second projection range. According to this aspect, the distortion at the boundary between the first projection image and the second projection image can be accurately corrected.

Appendix 6

According to another aspect, in the control method according to one of Appendices 1 to 5, the third structured light may be generated by masking a part corresponding to a difference between the first projection range and the third projection range in the first structured light, and the fourth structured light may be generated by masking a part corresponding to a difference between the second projection range and the fourth projection range in the second structured light. According to this aspect, since the interval of the measurement patterns is unchanged between the third structured light and the first structured light and the interval of the measurement patterns is unchanged also between the fourth structured light and the second structured light, the processing load on the projector 10 in the second detection processing SA140 is prevented from being higher than the processing load on the projector 10 in the first detection processing SA110.

Appendix 7

According to another aspect, in the control method according to one of Appendices 1 to 5, the third structured light may be generated by reducing the first structured light, and the fourth structured light may be generated by reducing the second structured light. According to this aspect, since the number of patterns of the measurement pattern is unchanged between the third structured light and the first structured light and the number of patterns of the measurement pattern is unchanged between the fourth structured light and the second structured light, the correspondence relationship between the camera coordinate system and the panel coordinate system can be specified without causing a loss of information in the second detection processing SA140.

Appendix 8

According to another aspect, in the control method according to Appendix 7, a user may be notified of a reduction ratio of the third structured light in relation to the first structured light and a reduction ratio of the fourth structured light in relation to the second structured light. According to this aspect, the user can grasp the reduction ratio of the third structured light in relation to the first structured light and the reduction ratio of the fourth structured light in relation to the second structured light and therefore can avoid an excessive increase in the processing load due to excessive reduction.

Appendix 9

According to another aspect of the present disclosure, a non-transitory computer-readable storage medium storing a program is provided, the program causing a computer to execute: from a first projector that projects a first projection image in a first projection range, projecting first structured light in the first projection range; picking up an image of the first structured light projected in the first projection range; from a second projector that projects a second projection image forming a content by being combined with the first projection into a second projection range at least a part of which overlaps the first projection range, projecting second structured light in the second projection range; picking up an image of the second structured light projected in the second projection range; specifying a second position in the second projection image corresponding to a first position in the first projection image, based on a result of image pickup of the first structured light and the second structured light; projecting third structured light from the first projector in a third projection range that is a range which is smaller than the first projection range and in which a part of the content is projected; picking up an image of the third structured light projected in the third projection range; projecting fourth structured light from the second projector in a fourth projection range that is a range which is smaller than the second projection range and in which another part of the content is projected; picking up an image of the fourth structured light projected in the fourth projection range; and specifying a geometric correction value of a composite image made up of the first projection image and the second projection image, based on a result of image pickup of the third structured light and the fourth structured light. According to this aspect, a correction with high accuracy can be executed even when projection extending beyond the frame is performed.

Appendix 10

According to still another aspect of the present disclosure, a projector includes: a projection device that projects a first projection image in a first projection range; a communication device that communicates with another projector that projects a second projection image forming a content by being combined with the first projection image, in a second projection range at least a part of which overlaps the first projection range; and a processing device, the processing device executing: projecting first structured light in the first projection range from the projection device; picking up an image of the first structured light projected in the first projection range; projecting second structured light in the second projection range from the another projector; picking up an image of the second structured light projected in the second projection range; specifying a second position in the second projection image corresponding to a first position in the first projection image, based on a result of image pickup of the first structured light and the second structured light; projecting third structured light from the projection device, in a third projection range that is a range which is smaller than the first projection range and in which a part of the content is projected; picking up an image of the third structured light projected in the third projection range; projecting fourth structured light from the another projector, in a fourth projection range that is a range which is smaller than the second projection range and in which another part of the content is projected; picking up an image of the fourth structured light projected in the fourth projection range; and specifying a geometric correction value of a composite image made up of the first projection image and the second projection image, based on a result of image pickup of the third structured light and the fourth structured light. According to this aspect, a correction with high accuracy can be executed even when projection extending beyond the frame is performed.

What is claimed is:

1. A control method for a multi-projection system, the multi-projection system including a first projector that projects a first projection image in a first projection range, and a second projector that projects a second projection image forming a content by being combined with the first projection image, in a second projection range at least a part of which overlaps the first projection range, the control method comprising:

projecting first structured light in the first projection range;

picking up an image of the first structured light projected in the first projection range;

projecting second structured light in the second projection range;

picking up an image of the second structured light projected in the second projection range;

specifying a second position in the second projection image corresponding to a first position in the first projection image, based on a result of image pickup of the first structured light and the second structured light;

projecting third structured light in a third projection range that is a range which is smaller than the first projection range and in which a part of the content is projected;

picking up an image of the third structured light projected in the third projection range;

projecting fourth structured light in a fourth projection range that is a range which is smaller than the second projection range and in which another part of the content is projected;

picking up an image of the fourth structured light projected in the fourth projection range; and specifying a geometric correction value of a composite image made up of the first projection image and the second projection image, based on a result of image pickup of the third structured light and the fourth structured light.

2. The control method according to claim 1, further comprising:

accepting an operation of designating the third projection range by a user; and accepting an operation of designating the fourth projection range by the user.

3. The control method according to claim 1, further comprising:

setting the third projection range and the fourth projection range, based on a result of image pickup of the first structured light projected in the first projection range and the second structured light projected in the second projection range.

4. The control method according to claim 3, further comprising:

notifying a user of a difference between the first projection range and the third projection range and a difference between the second projection range and the fourth projection range before specifying the geometric correction value.

5. The control method according to claim 1, wherein the composite image is a tiled image in which a part of the first projection range overlaps a part of the second projection range, and the first position is a position in a part of the first projection range, and the second position is a position in a part of the second projection range.

6. The control method according to claim 1, wherein the third structured light is generated by masking a part corresponding to a difference between the first projection range and the third projection range in the first structured light, and the fourth structured light is generated by masking a part corresponding to a difference between the second projection range and the fourth projection range in the second structured light.

7. The control method according to claim 1, wherein the third structured light is generated by reducing the first structured light, and the fourth structured light is generated by reducing the second structured light.

8. The control method according to claim 7, wherein a user is notified of a reduction ratio of the third structured light in relation to the first structured light and a reduction ratio of the fourth structured light in relation to the second structured light.

9. A non-transitory computer-readable storage medium storing a program, the program causing a computer to execute:

from a first projector that projects a first projection image in a first projection range, projecting first structured light in the first projection range;

picking up an image of the first structured light projected in the first projection range;

from a second projector that projects a second projection image forming a content by being combined with the first projection into a second projection range at least a part of which overlaps the first projection range, projecting second structured light in the second projection range;

picking up an image of the second structured light projected in the second projection range;

specifying a second position in the second projection image corresponding to a first position in the first projection image, based on a result of image pickup of the first structured light and the second structured light;

projecting third structured light from the first projector in a third projection range that is a range which is smaller than the first projection range and in which a part of the content is projected;

picking up an image of the third structured light projected in the third projection range;

projecting fourth structured light from the second projector in a fourth projection range that is a range which is smaller than the second projection range and in which another part of the content is projected;

picking up an image of the fourth structured light projected in the fourth projection range; and specifying a geometric correction value of a composite image made up of the first projection image and the second projection image, based on a result of image pickup of the third structured light and the fourth structured light.

10. A projector comprising:

a projection device that projects a first projection image in a first projection range;

a communication device that communicates with another projector that projects a second projection image forming a content by being combined with the first projection image, in a second projection range at least a part of which overlaps the first projection range; and a processing device, the processing device executing:

projecting first structured light in the first projection range from the projection device;

picking up an image of the first structured light projected in the first projection range;

projecting second structured light in the second projection range from the another projector;

picking up an image of the second structured light projected in the second projection range;

specifying a second position in the second projection image corresponding to a first position in the first projection image, based on a result of image pickup of the first structured light and the second structured light;

projecting third structured light from the projection device, in a third projection range that is a range which is smaller than the first projection range and in which a part of the content is projected;

picking up an image of the third structured light projected in the third projection range;

projecting fourth structured light from the another projector, in a fourth projection range that is a range which is smaller than the second projection range and in which another part of the content is projected;

picking up an image of the fourth structured light projected in the fourth projection range; and specifying a geometric correction value of a composite image made up of the first projection image and the second projection image, based on a result of image pickup of the third structured light and the fourth structured light.

* * * * *